Aug. 14, 1945.   A. A. McCORMACK   2,382,245
METHOD OF MANUFACTURING SHAFT SEAL ASSEMBLIES
Filed Dec. 30, 1942

INVENTOR.
Alex A. McCormack.
BY Grevev, Hardwar & Fehr,
Attorneys.

Patented Aug. 14, 1945

2,382,245

UNITED STATES PATENT OFFICE 2,382,245

METHOD OF MANUFACTURING SHAFT SEAL ASSEMBLIES

Alex A. McCormack, Dayton, Ohio, assignor to General Motors Corporation, Dayton, Ohio, a corporation of Delaware Application December 30, 1942, Serial No. 470,571

3 Claims. (Cl. 29—148)

This invention relates to an improved method of manufacturing a shaft seal assembly.

One object of this invention is to provide a method of manufacturing shaft seals which makes it possible to quickly and cheaply manufacture an improved type of shaft seal.

Heretofore it has been considered impractical to use a radially extending rubber or rubber-like diaphragm for shaft seal purposes because of the difficulty of maintaining the floating sealing ring carried thereby in proper relationship to the adjacent sealing surface and because of the difficulty of designing a balanced diaphragm in which changes in the pressure would not change the contact pressure at the seal surfaces. It is an object of this invention to so construct and arrange the parts that a rubber or rubber-like material may be used for the diaphragm.

A still further object of this invention is to provide an improved method of machining the surfaces of a shaft seal ring and its mounting means.

Further objects and advantages of the present invention will be apparent from the following description, reference being had to the accompanying drawing, wherein a preferred form of the present invention is clearly shown.

Figure 1:
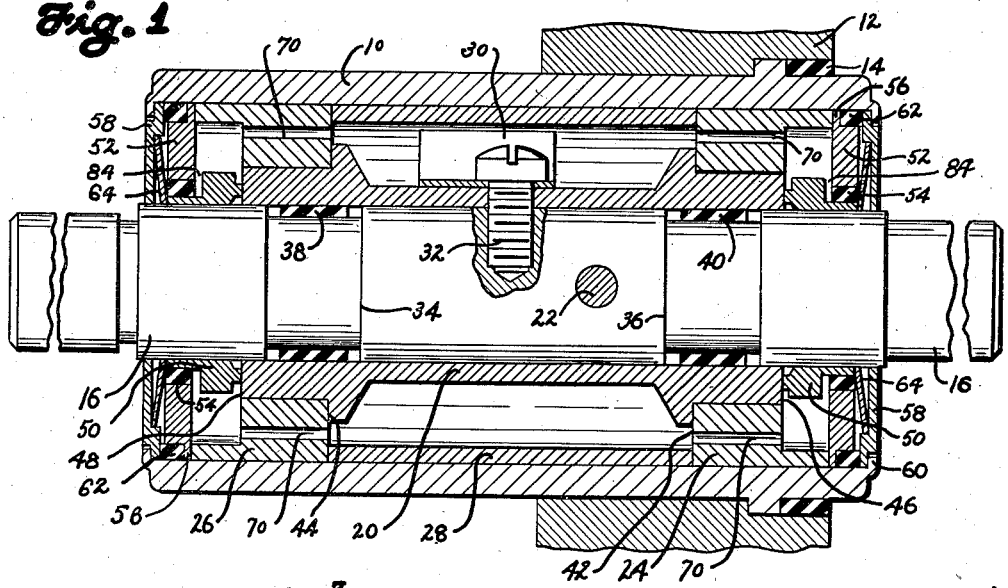
Figure 1 is a sectional view of a shaft seal bearing arrangement embodying my invention.

Referring now to Fig. 1 of the drawing in which I have shown a preferred arrangement embodying features of my invention, reference numeral 10 designates an outer cylindrical casing which is adapted to project through a wall 12 which may, for example, be the wall of a cabin or the wall of a crank case. A rubber-like gasket 14 is provided as shown so as to provide a gastight seal between the casing 10 and the wall 12. The gasket may, for example, be a neoprene gasket or it may be made of any other suitable material which is capable of providing a gastight seal and which will not be affected by the gas or liquid with which it comes in contact. Reference numeral 16 designates the power transmitting shaft which is journaled in the casing 10. A steel alloy sleeve 20 is secured to the shaft 16 by means of a suitable pin 22. The sleeve 20 has its ends journaled in similar bearing elements 24 and 26. The bearing elements 24 and 26 are held in suitably spaced relationship by means of a spacer sleeve 28. The space between the sleeves 20 and 28 is partially filled with a lubricant which serves to lubricate the bearing surfaces and the shaft seals as will be explained more fully hereinafter.

A lubricant finger 30 is bolted to the sleeve 20 and the shaft 16 by means of a bolt 32. The shaft 16 is recessed as shown at 34 and 36 so as to provide room for gaskets 38 and 40 which serve to prevent the leakage of gas or liquid between the shaft 16 and the sleeve 20. The gaskets 38 and 40 are preferably made of a synthetic rubber such as neoprene or some similar gasket material which is unaffected by lubricant. It will be noted that the gaskets are slightly narrower than the recesses 34 and 36 whereby the gaskets have room to expand along the shaft. In order to provide a good seal between the shaft 16 and the sleeve 20, the gaskets are made slightly thicker than the depth of the recesses whereby the gaskets are compressed. No appreciable clearance is provided between the shaft 16 and the sleeve 20 whereby the outer surfaces of the sleeve are at all times parallel to the outer surface of the shaft.

Shoulders 42 and 44 are provided which serve as end thrust bearing surfaces which cooperate with the bearing elements 24 and 26 respectively. The end surfaces 46 and 48 serve as shaft sealing surfaces which cooperate with the yieldably mounted sealing rings 50. The sealing rings 50 are carried by the main housing 10, as will be explained more fully hereinafter, and cooperate with the rest of the structure to provide a leak-proof seal between the housing 10 and the sleeve 20. The shaft seal structure is the same at both ends so only the one shaft seal will be described. The same reference numerals have been used for designating like parts of the seals. In order to provide for the necessary amount of movement of the seal ring 50, the ring 50 is vulcanized to a flat washer element 52 by means of the rubber-like material 54 which is preferably a synthetic rubber such as "neoprene" which is unaffected by the lubricant and the fluids which come in contact with the element 54. The outer flange 56 of the element 52 rests against the end surface of one of the bearing elements such as the element 24. Each end of the casing 10 is closed by means of a member 58 which is constructed as shown and which is held in place by means of a flange 60 which is formed as a part of the casing 10 and is spun over after the parts are all assembled in accordance with well known practice. A gasket 62 is provided between the outer edge of element 58 and the flange 56 so as to provide a tight seal between the member 52 and the casing 10. A bowed washer 64 of the type commonly referred to as a Bellville washer is provided between the end member 58 and the sealing ring element 50 and serves to bias the ring 50 into sealing engagement with the end surface of the sleeve element 20.

By virtue of this construction, the element 52 together with the neoprene insert 54 functions as a diaphragm which permits the necessary floating mounting for the sealing ring 50.

As shown in the drawing the annular center of pressure of the diaphragm 54 is substantially in alignment with the outer edge of the pressure area of the ring 50 and the outer edge of the diaphragm is anchored to the member 52. Thus the arrangement is such that the diaphragm is in effect a balanced diaphragm in which the pressure within the sealed chamber acting to force the ring 50 away from its seat is substantially equal to the pressure within the chamber acting to force the ring 50 against its seat. It will also be noted that the arrangement of the shaft seal is such that changes in the pressure of the surrounding atmosphere will have no appreciable effect upon the force with which the seal ring 50 contacts its seat.

In order to provide adequate lubrication of the sealing surfaces, I have provided a plurality of apertures 70 in the bearing elements 24 and 26 through which the lubricant may be circulated by the finger 30.

In any shaft seal it is very important to provide accurately machined and accurately aligned sealing surfaces. In order to provide accurately aligned sealing surfaces, it is important to provide accurately machined surfaces for mounting the shaft seal assembly. Even the slightest misalignment of the sealing surfaces or of the means for mounting the shaft seal assembly will cause leakage and uneven wear of the sealing surfaces.

Figure 2:
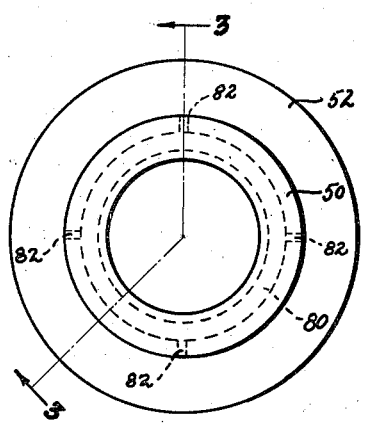
Fig. 2 is an elevational view of the blank from which the diaphragm and stationary sealing ring are made.
Figures 3, 4:
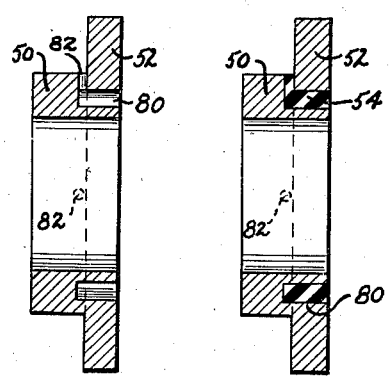
Fig. 3 is a sectional view of the blank shown in Fig. 2 taken on line 3—3 of Fig. 2.
Fig. 4 is a view similar to Fig. 3 showing the diaphragm material molded in place.
Figure 5:
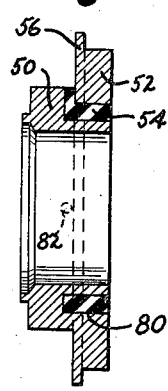
Fig. 5 is a view similar to Fig. 4 showing the main sealing ring surface and the diaphragm mounting surface after having been machined.
Figure 6:
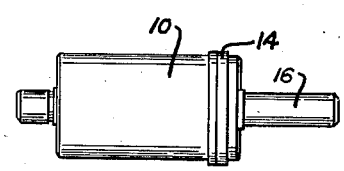
Fig. 6 is an elevational view of the entire assembly on a reduced scale.

In order to obtain accurately machined surfaces which are properly aligned, I have found the following procedure very helpful. A blank constructed as shown in Figs. 2 and 3 is first made up with a circular groove 80 in its one face which is later filled with the rubber-like gasket material 54 as shown in Fig. 4. In order to facilitate the filling of the circular groove 80 a plurality of holes 82 are drilled so as to provide openings through which the air in the bottom of the groove can escape as the groove is filled with the gasket material. After filling the groove with the gasket material which is preferably vulcanized to the side walls of the groove 80, the mounting surfaces and sealing surfaces are machined so as to produce an element constructed as shown in Fig. 5. After the mounting surfaces and the main sealing surface have been properly machined and finished, the metallic connection between the sealing ring 50 and the mounting ring 52 is severed by making a radial cut as shown at 84 in Fig. 1. By virtue of this procedure the critical surfaces of the rings 50 and 52 may be machined after the vulcanizing operation but prior to the time that the ring 50 is cut loose from the ring 52.

While the form of embodiment of the invention as herein disclosed, constitutes a preferred form, it is to be understood that other forms might be adopted, all coming within the scope of the claims which follow.

What is claimed is as follows:

1. The method of manufacturing a shaft seal assembly including a pair of elements joined together by a yieldable connection and each element having a surface normally disposed in a definite relationship to a surface on the other element which comprises forming a blank having sufficient material for both of said elements, said blank being formed with a substantially circular groove intermediate portions of said material for said elements, filling said groove with a yieldable material, machining said surfaces, and thereafter making a radial cut in said blank so as to sever said blank intermediate the sides of said groove to form a pair of elements joined together by the yieldable material.

2. The steps in the process of manufacturing an assembly having two substantially rigid elements connected by a yieldable member which comprises forming a blank having sufficient material for both of said elements, cutting a substantially circular groove in said blank, filling the groove with a yieldable material, vulcanizing said material to the walls of said groove, and thereafter making a radial cut in said blank so as to sever the blank intermediate the edges of said yieldable material to form a pair of elements joined together by a yieldable connection.

3. The steps in the process of manufacturing an article having two substantially rigid members connected by a flexible member which comprises forming a recess in a blank, a portion of the wall of said recess forming a part of one of said rigid members and another portion of the wall of said recess forming a part of the other of said rigid members, filling the recess with a flexible material which will adhere to the wall portions of said recess, and thereafter severing the blank between said wall portions to form the two rigid members connected by said flexible material.

ALEX A. McCORMACK.